UNITED STATES PATENT OFFICE.

MAX ISLER, OF MANNHEIM, GERMANY, ASSIGNOR TO BADISCHE ANILIN & SODA FABRIK, OF LUDWIGSHAFEN-ON-THE-RHINE, GERMANY, A CORPORATION.

ANTHRACENE DYE AND PROCESS OF MAKING SAME.

No. 860,480.  Specification of Letters Patent.  Patented July 16, 1907.

Application filed April 9, 1907. Serial No. 367,255.

*To all whom it may concern:*

Be it known that I, MAX ISLER, chemist, a citizen of the Swiss Republic, residing at Mannheim, Germany, have invented new and useful Improvements in Anthracene Dyes and Processes of Making the Same, of which the following is a specification.

I have discovered that by melting dinitrodianthraquinonylamin with alkali sulfid I can obtain a new coloring matter which dyes cotton from an alkaline hydrosulfite vat yielding blue shades. The reaction which occurs probably consists of a reduction of the nitro groups and formation of an azin ring in accordance with the following scheme

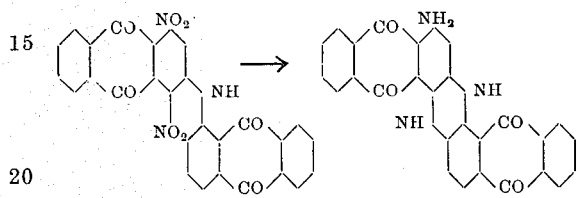

The new coloring matter consists of a blue powder which is insoluble in water and in dilute acids and in dilute alkalies. It is soluble in concentrated sulfuric acid yielding an olive brown solution which upon dilution with water gives rise to blue flakes.

For the sake of convenience I give the following method of preparing dinitrodianthraquinonylamin. The parts are by weight. Suspend one (1) part of 1.2'-dianthraquinonylamin (obtainable by condensing together 1-amidoanthraquinone and 2-chloranthraquinone as described in the specification of Letters Patent No. 814,137), in from ten (10), to twenty (20), parts of nitrobenzene, add one (1) part of ninety-three (93) per cent. nitric acid, and stir, for about one (1) hour, at a temperature of from sixty (60), to eighty (80), degrees centigrade, whereupon a beautifully crystallized nitro compound separates out.

The following example will serve to illustrate further how this invention can be carried into practical effect, but my invention is not confined to this example. The parts are by weight. Introduce one (1) part of dinitrodianthraquinonylamin (such as can be obtained as described above) into five (5) parts of molten sodium sulfid to which, preferably, two (2) parts of solid caustic soda have been added, and stir the whole, at the temperature of the boiling waterbath, for about two (2) hours, dilute the melt with water, and filter off the coloring matter which separates out, and purify it, if desired, by dissolving it in alkaline hydrosulfite and precipitating it by passing air through the solution obtained. The coloring matter so obtained is, when dry, blue and the color of a paste thereof is pure blue. It dissolves in concentrated sulfuric acid, yielding an olive-brown solution which, upon dilution with water, gives rise to blue flakes. It is soluble in alkaline hydrosulfite and from this solution dyes cotton blue shades.

Now what I claim is:

1. The process of producing coloring matter by melting dinitrodianthraquinonylamin with alkali sulfid.

2. As a new article of manufacture the coloring matter which can be obtained by melting dinitrodianthraquinonylamin with alkali sulfid, which coloring matter consists of a blue powder which is insoluble in water and in dilute acids and in dilute alkalies and is soluble in concentrated sulfuric acid yielding an olive brown solution which upon dilution with water gives rise to blue flakes and which coloring matter dissolves in alkaline hydrosulfite yielding a vat which dyes cotton blue shades.

In testimony whereof I have hereunto set my hand in the presence of two subscribing witnesses.

MAX ISLER.

Witnesses:
  ERNEST F. EHRHARDT,
  J. ALEC. LLOYD.